United States Patent [19]

Durkin

[11] Patent Number: 4,954,029
[45] Date of Patent: Sep. 4, 1990

[54] REMOVABLE CHASSIS FRONT PIN AND FRONT BOLSTER END ASSEMBLY

[76] Inventor: Robert O. Durkin, 1735 Twentieth St., NW., Washington, D.C. 20009

[21] Appl. No.: 761,836

[22] Filed: Aug. 2, 1985

[51] Int. Cl.$^5$ .............................................. B60P 7/00
[52] U.S. Cl. ...................................... 410/80; 292/143; 292/337
[58] Field of Search ..................... 410/76, 80, 81, 84, 410/90, 91; 292/143, 153, DIG. 71, 173, 337; 70/DIG. 58; 296/35.3

[56] References Cited

U.S. PATENT DOCUMENTS

| | | | |
|---|---|---|---|
| 462,682 | 11/1891 | Bashaw et al. | 410/84 |
| 919,750 | 4/1909 | Neumeister | 292/153 X |
| 1,266,086 | 5/1918 | Wesolowski | 292/173 |
| 1,609,342 | 12/1926 | Winters et al. | 292/DIG. 71 X |
| 3,860,276 | 1/1975 | Lambrecht | 292/337 X |
| 4,321,000 | 3/1982 | Novak | 296/35.3 X |
| 4,352,517 | 10/1982 | Bertolini | 296/35.3 |
| 4,486,132 | 12/1984 | Schulz et al. | 410/81 |

Primary Examiner—Margaret A. Focarino
Assistant Examiner—Joseph D. Pape
Attorney, Agent, or Firm—Gipple & Hale

[57] ABSTRACT

An apparatus for front end locking of containers on a chassis comprising a locking pin moveable in a sleeve formed by a locking pin housing. A pivotable handle is mounted to the locking pin housing with one end extending into a chamber formed in the locking pin to engage the locking pin and cam it into reciprocal positions through the action of a force exerted on the other end of the handle.

11 Claims, 4 Drawing Sheets

REMOVABLE CHASSIS FRONT PIN AND FRONT BOLSTER END ASSEMBLY

BACKGROUND OF THE INVENTION

The present apparatus is directed towards an apparatus for the locking of chassis type containers with a lock pin which is moveable in a sleeve through the action of a handle so that it is cammed by the handle into a locked and released position.

Front end locking devices have been known previous to the prior invention. Such devices have been used on the front end of a tractor trailer chassis. Lock pins of such end locking arrangements are horizontally moveable between the released and locked position and absorb the container forces which act upward and sideways.

Examples of vertical moveable container locking arrangements are shown in United Kingdom Patent No. 1,363,279, U.S. Pat. No. 2,427,603, U.S. Pat. No. 4,352,517 and U.S. Pat. No. 4,486,132. The United Kingdom 1,363,279 Patent discloses a twist lock which is used to locate and hold down containers on the bed of a vehicle. This twist lock comprises a head mounted on a spindle rotatable by a handle to locate the head in a position overlying a part of and securing a corner casting on the container. The head is aligned with an aperture and a housing so that the head with the spindle may be retracted within the housing to a retracted position. A register below the housing and rotatable by the spindle maintains alignment of the spindle assembly with the aperture during movement of the head. U.S. Pat. No. 2,427,603 discloses a toggle clamp for securing a demountable freight compartment to a transportation vehicle. The clamp consists of three movable members including a clamping jaw constructed with a pair of similar congruently arranged plates which are spaced by a filler piece having a threaded bore with an adjusting screw. A handle operated actuator is constructed of a single plate having its apex fitting between the lower outer ends of two plates and the handle extension which extends radially. A link constructed of two similar members are arranged on opposite sides of the actuator which provide a fulcrum about which the actuator turns when the handle is lifted to open the clamp.

U.S. Pat. No. 4,352,517 discloses a pin construction for locking the front end of a standard container on a conventional goose neck chassis to secure the container against movement relative to the chassis. The invention discloses a locking pin employing a rack and pinion activation to obtain an end line thrust including a gear rack, a handle including a spur gear quadrant activating the gear rack and a latch associated with the handle.

The problems encountered with devices of the type previously described were partially solved by the U.S. Pat. No. 4,486,132. In this device the gateway and mounting are permanently arranged on a mounting plate with a perpendicular orientation to the plane of movement of the operating handle with the mounting plate being located on the end of the guideway which faces the locked part of the lock bolt. While this device solved some of the problems which were present in the industry, the handle frequently was bent, thus becoming hard to move, causing operator bruising and safety hazards. Furthermore the forces directed on the pin and pin housing from containers placed thereon or forces exerted there against cause bending and shearing making the device useless.

The present invention concerns a device for the locking of containers for freight handling, securing the front end of the container to a chassis semi-trailer for highway and rail transport. The front locking pin assembly is welded or otherwise suitably attached to a chassis front bolster beam, and the penetrating pin or lockbolt is movable in a guideway approximately parallel with the longitudinal axis of the chassis. In the locked position, the penetrating pin protrudes into the lower corner casting of the container for freight handling, through an oblong hole. The shape of this oblong hole is specified by the International Standards Organization (I.S.O.) Specification Ref. No. ISO1161-1980 (E). The pin penetration is specified by the Association of American Railroads, Manual of Standards and Recommended Practices Section I, Specification M-943-80 and other organizations such as A.N.S.I.

Devices of the type have been long known and used especially on the front bolster beams of container chassis. The disadvantages of the prior art's locking arrangements such as those known in U.S. Pat. No. 4,352,517 and U.S. Pat. No. 4,486,132 are numerous.

First, the prior art locking devices require the fabrication of chassis front bolster beams having a substantial width, as measured in the vertical plane to provide encasement of their operating pin and handle within the vertical projection of the front bolster to prevent damage. For example, whereas the device shown in U.S. Pat. No. 4,486,132 requires a bolster as much as 8 inches wide to totally encase it, the present invention can be installed in a bolster 6 inches wide and still remain totally encased.

In addition, the prior art locking devices utilized operating handles which must be grasped by a hand held with the palm of the hand extended flat in the horizontal plane as in U.S. Pat. No. 4,486,132. Handles thus operated are not only awkward for the operator to grasp and manipulate, but also require the operator to actuate the handle in a confined space of encasement while simultaneously holding a latch open in order to rotate the handle. The present invention has the advantages of a handle which can be easily grasped in the vertical plane and operated.

The prior art locking devices also require the end of the bolster beam to have a substantially wide cut-out and removal of the front vertical face of the "U"-shaped bolster beams, in order to operate the locking device. The material coped out from the bolster beam substantially reduces its structural integrity and ability to resist torsional forces applied in service. Consequently, the bolster beams are frequently damaged in service, particularly about their ends. As an example, the device shown in U.S. Pat. No. 4,486,132 requires at least 15 inches of material to be coped out from the each end of a 96 inch wide bolster beam. The present invention provides an endplate which is installed in the vertical plane of the bolster beam and has the advantage of substantially increasing the strength of the bolster beam and its resistance to torsional bending and subsequent damage.

The prior art locking devices use bolts, nuts and washers to fasten their handle and latch, requiring the manufacturer of the chassis to punch or drill and align numerous access holes for the removal of these fasteners. The present invention has the advantage of using only one easily removable pin which requires only one access hole.

Prior art locking devices such as that disclosed in U.S. Pat. No. 4,486,132 require the manufacturer to dimensionally control their installation by centering the penetrating pin in the bolster beam, according to prescribed transverse centers across the overall width of the chassis bolster beam and a vertical height in relation to the top surface of the chassis gooseneck beam. The control of these dimensions and installation is not easily accomplished. The present invention provides an endplate to be secured to the end of the chassis bolster and has the advantages of making the fabrication of the bolster beam simpler and the maintenance of the dimensional tolerances for installation of the locking device more easily accomplished.

It should also be noted that prior art locking devices are installed in one continuous bolster beam section and are secured by welding and not easily replaced without flame-cutting and subsequent damage to the bolster beam. The present invention is releasably attached to the endplate and thus can be quickly and easily removed for maintenance, repair or replacement. This feature is most advantageous to the fleet operator of chassis in that it provides the ability to quickly return a damaged chassis to service and does not necessitate flame-cutting to replace a locking device.

Another problem is that prior art locking devices are attached to the bolster beam by welding and provide for only one overall width of chassis, most commonly 96 inches. The present invention is releasably attached and thus has the advantage of providing for the rapid and economical conversion of a chassis to some different overall width, as for example 96 inch wide converted to 102 inch wide.

A further problem is that prior art locking devices provided only one function: i.e., the locking of containers on chassis. The present invention is releasably attached and provides means to effectively reduce the overall width of the chassis, thus the chassis may be, among other possibilities, shipped inside the confines of containers of conventional (standard) widths, as for example a 96 inch wide chassis inside a 96 inch wide container. The endplates can be used, among other things, to secure the chassis in stacks for repositioning and to endframes for shipment as containerized freight.

The present invention has produced a locking mechanism which can be produced independently from a chassis and is removable so that locking mechanism is only operational when it is desired to be used and not at other times when the chassis is in transit or subject to collision or shearing forces. Thus the installation expense is drastically reduced because the locking assembly can be operational at the time it is needed without the necessity of carrying around total locking housings to be welded on to the chassis.

SUMMARY OF THE INVENTION

The present invention is specifically directed towards a front pin locking mechanism for locking chassis type containers with a lock pin which is moveable in a sleeve through an interaction of a handle to place a mechanism in a locked or released position. The locking mechanism is comprised of one cast section defining a key way and a second cast section defining a key which can be removably mounted in the key way of the first section, thus allowing easily removable parts and repair of the same if such is necessary.

The invention will be more fully explained hereafter for the aid of the preferred embodiment illustrated in the drawings.

DETAILED DESCRIPTION OF THE DRAWINGS

Figure 1:
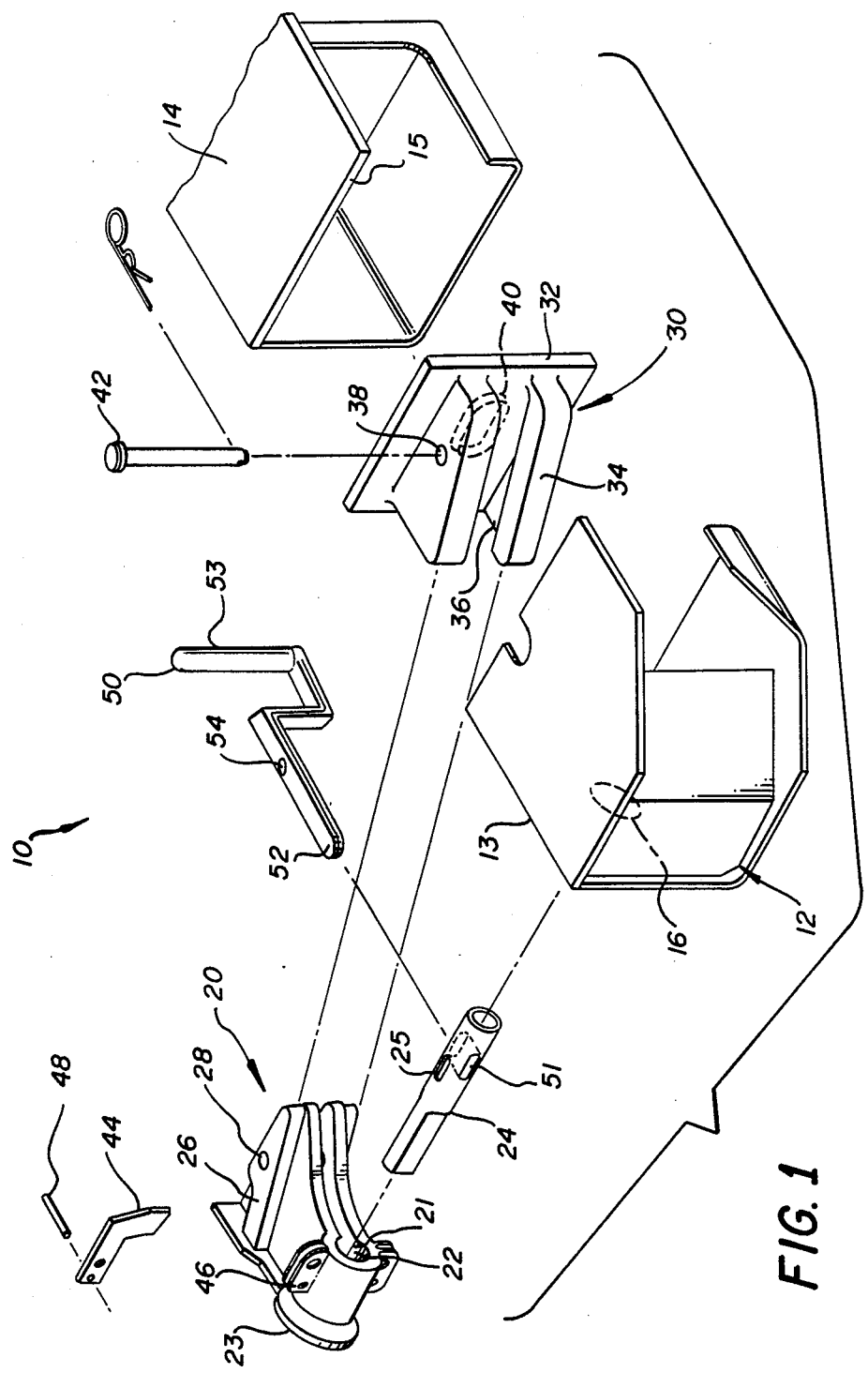
FIG. 1 shows an exploded isometric view of the locking device.
Figure 2:
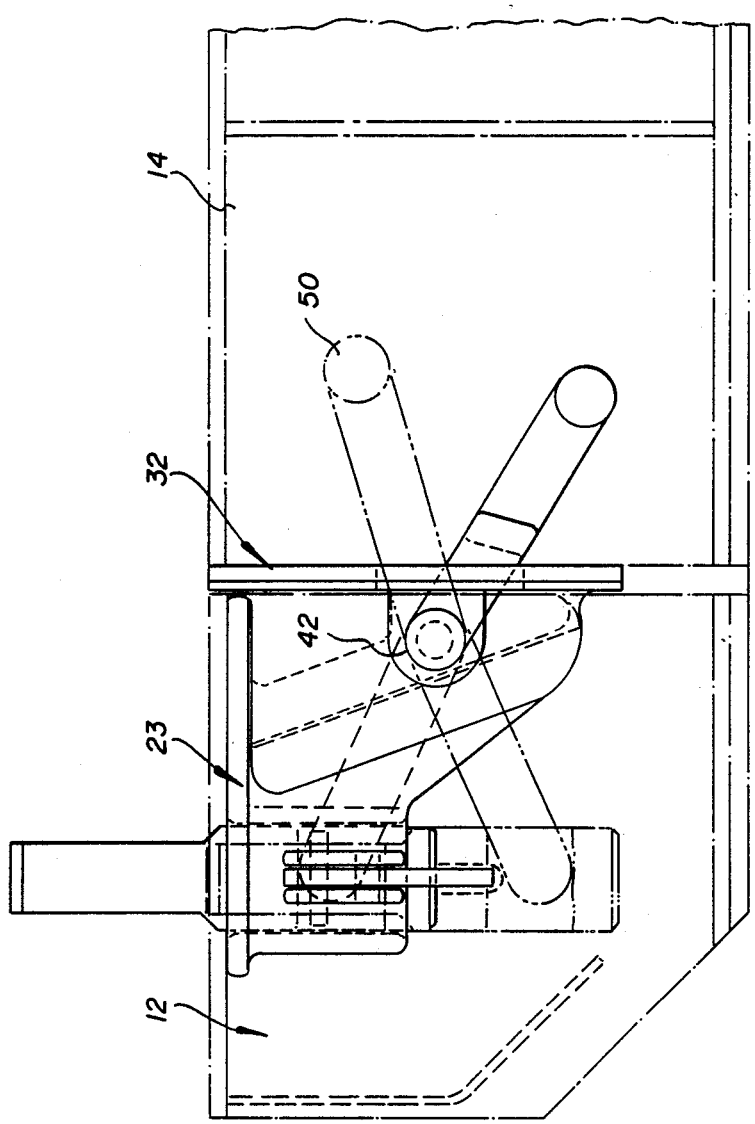
FIG. 2 shows a side elevational view of the pin locking device.
Figure 3:
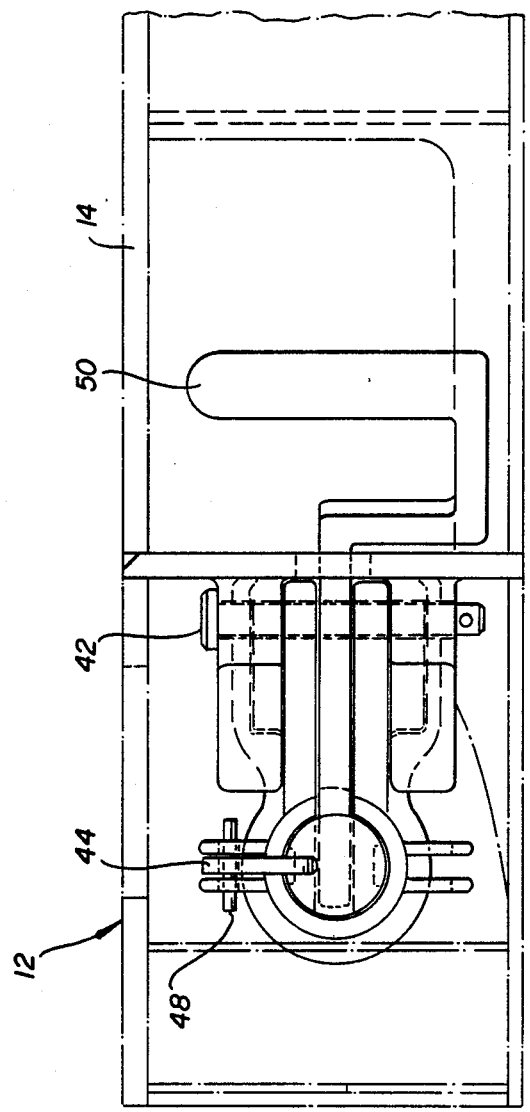
FIG. 3 shows a top plan view of the pin locking device shown in FIG. 2.
Figure 4:
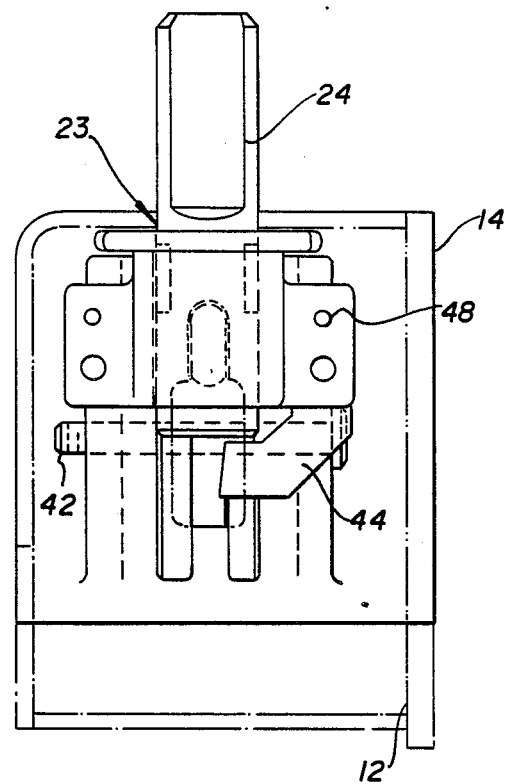
FIG. 4 shows a front elevation view of the pin locking device shown in FIG. 2.

The preferred embodiment and best mode in the invention is disclosed in FIGS. 1 through 4. The locking assembly 10 basically comprises a lock pin housing 12 and associated members adapted to be secured to a bolster beam 14. The lock pin housing 12 defines an aperture 16 which is aligned with a bore 22 of key member 20 which is adapted to slideably receive locking pin 24. The key member 20 defines a key section 26 having a through going bore 28 which is transverse to the axis of bore 22. The key member 20 is provided with a seat plate 23 which is adapted to seat against the inner surface of vertical side 13 of lock pin housing 12 and be welded thereto. The key section 26 of the key member 20 is adapted to slide into keyway 36 of keyway member 30. Keyway member 30 is provided with a support plate 32 which engages the outward edge 15 of bolster beam 14 for welding thereto and outwardly extending flanges 34 which define a keyway 36 therein. Each of the flanges 34 have an axially aligned throughgoing bore 38 which are axially aligned with bore 28 when the key section 26 is fitted into keyway 36. Bores 28 and 38 when axially aligned, allow pivot pin 42 to be inserted therein to hold the key member 20 and keyway member 30 together. The pivot pin 42 is a conventional headed pin held in place by a cotter pin. The support plate 32 defines a slot or oblong aperture 40 therein which receives handle 50. The support plate 32 is adapted to be welded to bolster beam member 14. A locking latch 44 is mounted in a yoke 46 integrally formed on the key member 20 and is held in a pivotable relationship in the yoke by pin 48. Locking pin 24 defines a locking slot 25 into which latch 44 can be selectively inserted to hold the locking pin in place in the retracted position and a cam slot or chamber 51 into which the camming end 52 of handle 50 extends. The latch 44 fits over the end of locking pin 24 when it is extended to hold it in an extended position. This relationship is best shown in FIG. 4. The interior diameter of sleeve 21 of the key member is sized to receive the lock pin 24 which actually slides within the bore of the sleeve and has an exterior diameter slightly smaller than the interior diameter of the bore allowing the lock pin 24 to slideably move back and forth through the sleeve 21 in response to the camming action of handle end 52.

The handle 50 defines a hand gripping portion 53 on one end with a distal flat camming end 52. The camming end extends through slot 40 defined in the support plate 32 and into chamber 51 of lock pin 24. The handle member 50 is also provided with an aperture 54 which is adapted to receive pivot pin 42 so that the handle member can rotate around the pivot pin within the pin support housing 12.

In operation the handle 50 is rotated around the pivot pin 42 so that the camming end 52 of the handle drives against the upper chamber wall of chamber 51 driving the locking pin 24 upward or alternatively against the lower chamber wall of the locking pin driving the locking pin downward out of the locking position. In the extended position latch 44 locks the lock pin in place by engaging the end of the lock pin as shown in FIG. 4 and in the retracted position the latch 44 locks the lock pin in place by entering slot 25 of the lock pin. The key and keyway members are removably fitted together for easy assembly or disassembly. Removal of the pivot pin 42 allows the handle 50 to be removed so that it no longer engages the locking pin 24. Thus the locking pin 24 can then be removed from the key member 20. The locking pin housing 12 and key member 20 which is preferably welded to it is then removed by slipping the key portion 26 out of the key way 36. The handle 50, pivot pin 42, locking pin 24, housing 12 and associated key member 20 are then stored for future use or future assembly. The keyway member 30 remains welded to bolster beam 14. Thus destruction or replacement of any of the parts in assembly is readily accomplished without destruction of other parts of the locking mechanism or the need for welding or cutting of the chassis or the locking mechanism.

What is claimed is:

1. A device for front end locking of containers on a chassis comprising a lock pin, a guideway assembly, said guideway assembly comprising a keyway member and a key member slideably mounted to said keyway member, said lock pin being moveable between a locking position in which one end of said lock pin protrudes from one end of said guideway assembly and a release position in which said one end of said lock pin is retracted into said guideway assembly, an operating handle pivotally mounted to said guideway assembly for pivotal movement within said guideway assembly, said lock pin including a chamber into which a portion of said handle extends allowing said handle when pivoted to cam said lock pin and reciprocally drive the lock pin within said guideway assembly.

2. A device according to claim 1 wherein said key member comprises a support plate, a key section and a sleeve.

3. A device according to claim 1 wherein said keyway member comprises a support plate defining an aperture, and keyway means.

4. A device according to claim 1 wherein said key member includes pivotable latch means, said latch means being adapted to engage and lock said lock pin in a predetermined position.

5. A device as claimed in claim 1 wherein said lock pin defines a locking slot and a cam chamber.

6. A device for the front end locking of containers on a chassis comprising a lock pin and a key member mounted to a housing, said lock pin being slideably mounted in a sleeve defined by said key member between a locking position in which one end of said lock pin protrudes from one end of said sleeve and a release position in which said one end of said lock pin is retracted into said sleeve; latch means mounted to said key member engaging said lock pin in a plurality of positions to hold said lock pin in a number of predetermined positions; a keyway member adapted to be mounted to said key member, an operating handle pivotally mounted on said keyway member, said operating handle engaging said lock pin, said keyway member being adapted to be mounted to said chassis.

7. A device according to claim 6 characterized in that the latch means is pivotally mounted in a yoke defined by said key member.

8. A device according to claim 6 wherein said lock pin defines a chamber of sufficient cross-sectional size to receive the end of said handle and said keyway member defines a throughgoing aperture adapted to receive said handle.

9. A device according to claim 6 wherein said keyway member includes pivot means adapted to hold said handle in a pivotable position.

10. A device according to claim 6 wherein keyway member comprises a support plate defining a throughgoing aperture, parallel wall means extending from said support plate defining a keyway and pivot means mounted to said wall sections.

11. A device for the front end locking of containers on a chassis comprising a lock pin and key means, said lock pin being slideably mounted in a sleeve defined by said key means, a keyway adapted to be mounted to said key means, an operating handle pivotally mounted on a keyway means, said operating handle engaging said lock pin, and being adapted to cam said lock pin in a reciprocal manner to assume a plurality of positions, latch means mounted to said key member engaging said lock pin in a plurality of positions to hold said pin in a number of predetermined positions, said latch means being pivotally mounted in a yoke defined by said key member.

* * * * *